US012215037B2

(12) United States Patent
Robbins (10) Patent No.: US 12,215,037 B2
(45) Date of Patent: Feb. 4, 2025

(54) SYSTEMS AND METHODS FOR RECOVERING SALTS, ALUMINUM, ALUMINA AND AMMONIA FROM SALT SLAG WASTE GENERATED IN ALUMINUM RECYCLING

(71) Applicant: Evergreen Alumina, LLC, Beckley, WV (US)

(72) Inventor: Riley Davis Robbins, Beckley, WV (US)

(73) Assignee: Evergreen Alumina, LLC, Beckley, WV (US)

( * ) Notice: Subject to any disclaimer, the term of this patent is extended or adjusted under 35 U.S.C. 154(b) by 0 days.

(21) Appl. No.: 18/511,056

(22) Filed: Nov. 16, 2023

(65) Prior Publication Data
US 2024/0083762 A1    Mar. 14, 2024

Related U.S. Application Data

(62) Division of application No. 17/097,655, filed on Nov. 13, 2020, now Pat. No. 11,834,343.
(Continued)

(51) Int. Cl.
*C01F 7/46*      (2006.01)
*B01D 1/28*      (2006.01)
(Continued)

(52) U.S. Cl.
CPC .................. *C01F 7/46* (2013.01); *B01D 1/28* (2013.01); *B02C 23/14* (2013.01); *B03B 9/04* (2013.01);
(Continued)

(58) Field of Classification Search
CPC .. C01F 7/023; C01F 7/025; C01F 7/46; C01C 1/02; C01C 1/12; C01D 3/08; C22B 21/0069; B03B 9/00; B03B 9/04
(Continued)

(56) References Cited

U.S. PATENT DOCUMENTS 4,073,644 A    *   2/1978   Papafingos ......... C22B 21/0092
                                                             241/20
4,348,366 A       9/1982   Brown
                             (Continued)

FOREIGN PATENT DOCUMENTS

CN        210620683 U     5/2020

OTHER PUBLICATIONS

"Aluminum Dross Furnance Salt Slags Processing" 2017, https://www.9 | lmetallurgist.corn/processing-salt-slags-aluminum-dross.furnace/#:-: text· Disposal%20of%20the%20salt%20slag,to%20the%20secondary%20aluminum%20industry.&text. Typically%2C%20dross%20and%20low%2Dgrade,2%20to%205%20pct%20cryolite.

*Primary Examiner* — Michael McCullough
*Assistant Examiner* — Molly K Devine
(74) *Attorney, Agent, or Firm* — Jaensson Law PLLC; Monika L. Jaensson, Esq.

(57) ABSTRACT

The disclosed technology includes a method for producing ultrafine alumina from salt slag waste generated in aluminum recycling useful in the manufacture of durable ceramic products; a system for recovering alumina from salt slag waste; a method and systems for recovering salts, aluminum and alumina from salt slag waste; and a method and systems of capturing ammonia in a process recovering salts, aluminum and alumina from salt slag waste. The methods and systems provided crush the dry particles of the salt slag waste, scrub the slag with water, and with steam and by means of a vented alumina press, dewater the scrubbed slag particles. In some methods and systems of the disclosed technology, the particles of the pressed alumina cake are further reduced. In some methods and systems, the salt in the salt effluent is crystalized. In some methods and systems of
(Continued)

the disclosed technology, the ammonia is contained and captured.

6 Claims, 5 Drawing Sheets

Related U.S. Application Data (60) Provisional application No. 63/065,143, filed on Aug. 13, 2020.

(51) Int. Cl.
  *B02C 23/14* (2006.01)
  *B03B 9/04* (2006.01)
  *C01C 1/02* (2006.01)
  *C01C 1/12* (2006.01)
  *C01D 3/08* (2006.01)

(52) U.S. Cl.
  CPC .................. *C01C 1/02* (2013.01); *C01C 1/12* (2013.01); *C01D 3/08* (2013.01)

(58) Field of Classification Search
  USPC .................................................... 209/13, 731
  See application file for complete search history.

(56) References Cited

U.S. PATENT DOCUMENTS

| | | |
|---|---|---|
| 5,198,200 A | 3/1993 | Yerushalmi |
| 5,901,910 A * | 5/1999 | Grosso ................ C22B 21/0069 241/24.15 |
| 6,199,779 B1 | 3/2001 | Mosher |
| 6,319,482 B1 | 11/2001 | Sawell |
| 2019/0300983 A1 | 10/2019 | Peel |
| 2019/0337816 A1 | 11/2019 | Cohen |

\* cited by examiner

SYSTEMS AND METHODS FOR RECOVERING SALTS, ALUMINUM, ALUMINA AND AMMONIA FROM SALT SLAG WASTE GENERATED IN ALUMINUM RECYCLING

BACKGROUND

The disclosed technology regards methods and systems for producing ultrafine alumina from salt slag waste generated in aluminum recycling, the ultrafine alumina being useful in the manufacture of durable ceramic products. The disclosed technology further regards a system for recovering alumina from salt slag waste generated in aluminum recycling. In addition, the disclosed technology provides a method and systems for recovering salts, aluminum and alumina from salt slag waste generated in aluminum recycling. In addition to other purposes, the disclosed technology also regards a method of capturing ammonia in a process recovering salts, aluminum and alumina from salt slag waste generated in aluminum recycling.

In aluminum recycling operations, salt slag waste is disposed of at great expense to the recycler and the environment, and new salt is purchased for the recycling process. Studies to date in recycling the salt slag waste have suggested that recycling the slag is not economically viable, and fail to assess the potential harm gaseous ammonia resulting from the process would have on workers in slag recycling. The disclosed technology provides novel and economically viable methods for recycling salt slag, recovering valuable byproducts, and controlling gaseous ammonia produced in slag recycling.

GENERAL DESCRIPTION

The disclosed technology includes a method for producing ultrafine alumina from salt slag waste generated in aluminum recycling, the ultrafine alumina being useful in the manufacture of durable ceramic products. The method includes the steps of: (i) crushing the dry particles of the salt slag waste to a size less than or equal to 4 mm; (ii) by means of an attrition scrubber, scrubbing the slag with water to release the salt into the water, resulting in a mixture of solid alumina and salt brine; (iii) with steam and by means of a vented alumina press, dewatering the scrubbed slag particles, resulting in alumina cake and salt effluent; and (iv) further reducing the size of the particles of the pressed alumina by cycling the particles through a particle size reduction apparatus and an air classifier, to an ultrafine size of equal to or less than 1 mm.

The disclosed technology further includes a system for recovering alumina from salt slag waste generated in aluminum recycling. The system includes a grizzly scalper, a feed hopper, a sizing screen, a hammer mill crusher, a magnet, an eddy current separator, an attrition scrubber, one or more sumps and pumps, and a vented alumina press. In this system, the grizzly scalper separates any dry particles of the salt slag above a first pre-determined size so that the larger particles may be broken to a size below the first pre-determined size. The dry slag particles, including those broken down, are then transferred to the sizing screen by means of the feed hopper so that the sizing screen may separate the slag particles into two batches, the first batch being less than a second pre-determined size and the second batch being greater than the second pre-determined size. The particles of the second batch are then crushed to a size about or below the second pre-determined size, and the eddy current separator removes any metallic particles from the crushed second batch. The remaining particles in the first and second batches are then placed in the attrition scrubber for scrubbing with water to release the salt into the water and form a mixture of alumina particles and salt brine. This mixture is further diluted in a sump, and then dewatered in a vented alumina press, producing an alumina cake and salt effluent Systems of the disclosed technology may further include a vapor compression desalination unit coupled with a boiler for evaporating water from the salt effluent and crystallizing the salt within the salt effluent. The crystallized salt may then be transferred through another sump and pump to a salt press for dewatering the crystallized salt mixture. Clean water gathered through this system may be recycled in the attrition scrubber and first sump of the system. Finally, the system may further include piping for delivering water vapor from the boiler to the vented alumina press to limit gaseous emission of deadly ammonia.

The disclosed technology further provides a method and systems for recovering salts, aluminum and alumina from salt slag waste generated in aluminum recycling. In this method, slag particles from the dry salt slag waste above a first pre-determined size are removed and broken into particles below the first pre-determined size. The dry slag particles are then separated into two batches, the first batch being less than a second pre-determined size, the second batch being greater than the second pre-determined size. The second particle batch is then crushed so that the non-metallic particles thereof are equal to or less than the second pre-determined size, and metals including aluminum are removed from the second batch. The batches are then combined and scrubbed with water to release salt into the water, diluted, and pressed in a vented alumina press, resulting in alumina cake and salt effluent. Water is evaporated from the salt effluent until the salt crystallizes. The crystallized salt is dewatered in a salt press, resulting in a potassium chloride and sodium chloride salt product.

In addition, the disclosed technology provides a method and system of capturing ammonia in a process recovering salts, aluminum and alumina from salt slag waste generated in aluminum recycling. In this method and system, non-metallic dry slag particles are crushed to a size of between about 2 mm and 4 mm, and aluminum is removed from the mixture by a magnet and an eddy current separator. The crushed dry slag is then scrubbed with water to release the salt into the water, and conveyed to a vented alumina press. The attrition scrubber and conveyance system are hermetically sealed. The scrubbed slag particles are then pressed with steam in the vented alumina press, resulting in alumina cake and salt effluent. The vent of the vented alumina press captures some of the gaseous ammonia generated in the wet process, and the steam captures other of the gaseous ammonia. In a crystallization and conveyance system, the water is evaporated from the salt effluent causing the salt to be crystalized, the evaporated water is condensed, and the crystallized salt is conveyed to a salt press. The salt press then dewaters the crystallized salt, resulting in a potassium chloride and sodium chloride salt product. The gaseous ammonia vented from the alumina press may be isolated via scrubbing by absorption. An ammonia stripper (an air stripper or, if ammonia concentration is >1%, a steam stripper) then strips dissolved ammonia from the water emerging from the alumina press.

DETAILED DESCRIPTION

Figure 1A:
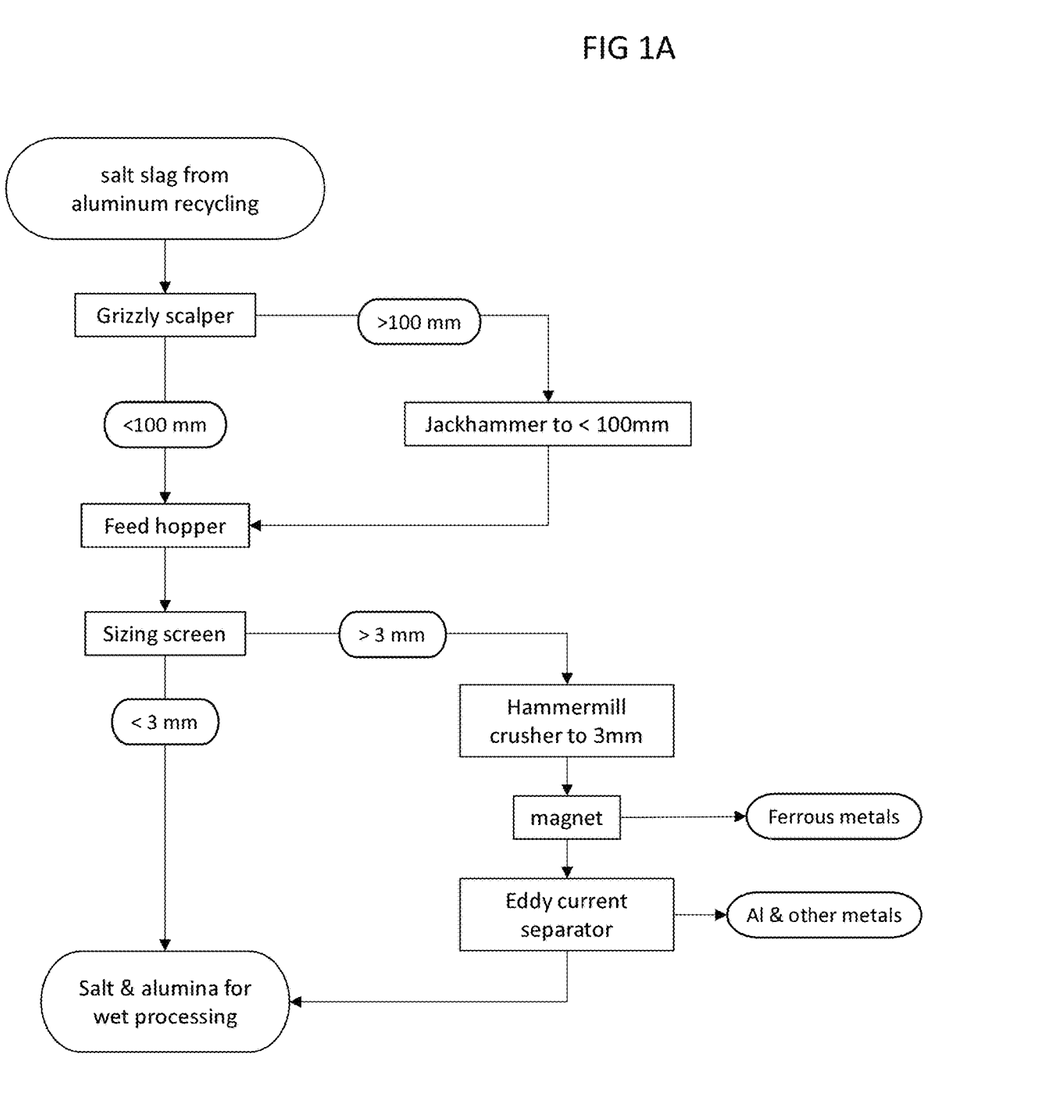
FIG. 1A is a system diagram of the dry process of an embodiment of the systems of the disclosed technology.
Figure 1B:
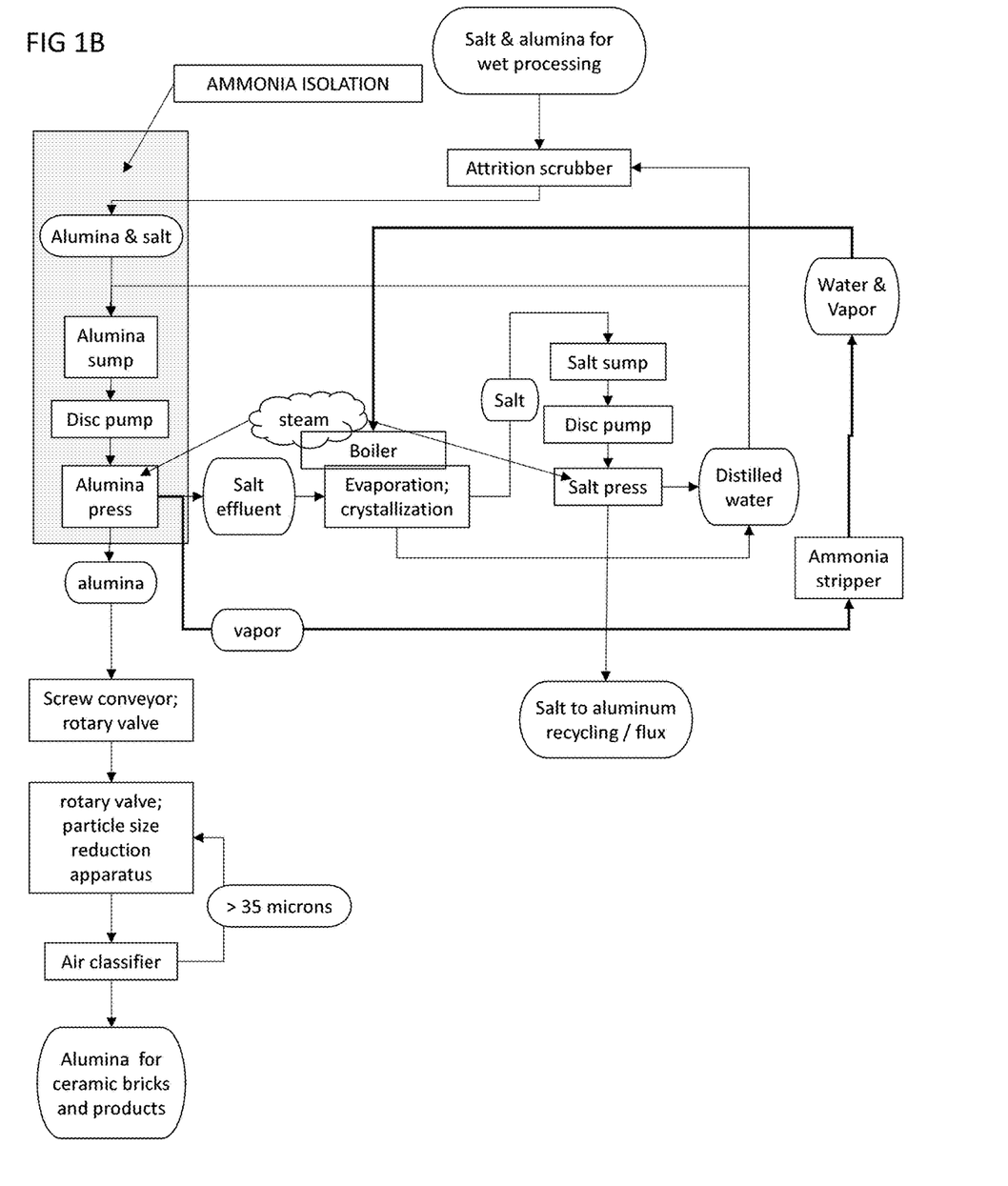
FIG. 1B is a system diagram of the wet process of an embodiment of the systems of the disclosed technology.

In an embodiment, as shown in FIGS. 1A and 1B, salt slag from aluminum recycling is provided. The slag may have particles of various sizes, including particles over 100 mm, and comprise primarily alumina, salt (potassium chloride and sodium chloride), aluminum and aluminum nitride. For example, the slag may include 85% alumina and aluminum nitride, 13% salt, and 2% aluminum other metals or elements.

As shown in the dry process diagram of FIG. 1A, a grizzly scalper or similar vibrating screen is used to isolate the slag particles having a dimension of over a first pre-determined size, such as, for example, 80 mm-120 mm, or 100 mm, and the same are jackhammered or otherwise broken into smaller sized particles (smaller than the first pre-determined size).

The slag is then provided to a sizing screen by means of a feed hopper, for example. The sizing screen, such as a five deck screen, separates particles into two batches, the first batch with particles less than a second pre-determined size, such as, for example, 2 mm-4 mm, or 3 mm; the second batch with particles greater than the second pre-determined size.

Non-metal particles greater than the second pre-determined size are then crushed to a size below the second pre-determined size, such as by means of a hammer mill crusher. Crushing the larger materials helps to liberate the various components thereof. The hammer mill crusher may have a ratio of reduction from 100:3 mm, for example. Ferrous materials (metals) may be removed after the larger materials are crushed (the metals will bend, but will not break, in the crusher) by a magnet or similar means for drawing ferrous metals out from the crushed particle mixture. Remaining metals including aluminum may then be separated from the crushed particle mixture using for example an eddy current separator. These crushed, dry particles (with metals removed) are combined with the first batch of particles for further processing. The separated aluminum and other metals are valuable metals available for resale.

Conveyors or other particle moving technology may be provided to move the particles from one process or step to another.

As shown in the wet process diagram of FIG. 1B, the dry particles remaining from the processing as hereinabove described are then scrubbed with water by means of, for example, an attrition scrubber, which dissolves the salt into the water. In an embodiment of an attrition scrubber, the blades thereof rotate in opposing directions. For example, the first, third and fifth blades may rotate clockwise, while the second, fourth and sixth blades may rotate counter clockwise, to effectively free and dissolve the salt into the water. Typically the liquid to solid (L/S) ratio in the scrubber would be between 0.33 mL/g and 0.54 mL/g, or 0.43 mL/g, and the particles would be scrubbed for about 8 minutes to 12 minutes, or about 10 minutes, removing and dissolving the salts from the solid particles to form a brine. The alumina and brine may then be removed from the scrubber to a sump, such as for example a ceramic lined sump, and additional water is added so that the mixture in the sump has an L/S ratio of about 0.9 mL/g to 1.1 mL/g, or 1.0 mL/g. The alumina and brine may be held in the sump for 30 minutes, to flush and further liberate the salts into the diluted brine.

The alumina and brine are then pumped to an alumina filter press by means of for example a disc pump. Suitable presses include 1200 mm filter presses, with 79 plates, manufactured by D. R. Sperry & Co., Aurora, Illinois. This filter press may operate at an initial fill of, for example, 450 gpm, at 50 feet, 978 RPM and 13.5 hp, with intermediate fills decreasing from 225 gpm to 125 gpm, at 100 ft and 150 feet, 1275 RPM and 1520 RPM, 19.9 hp and 24.6 hp, respectively. In furtherance of this example, a top off fill may be provided at 45 gpm at 185 feet, with 1658 rpm at 27.5 hp. The press plates may be heated to between 280° F. and 320° F., or about 300° F. The alumina press releases the salt effluent from the mixture and provides a dry alumina product, having about or over 90% alumina. The alumina press uses pressure from the plates thereof to squeeze out the salt effluent, and steam (in the above example, about 2,450 lbs steam, applied for about 30 minutes) to capture the ammonia released at this stage of the process. A sump and pump system may collect and convey the salt effluent for further processing and salt capture, as hereinafter described.

The significant production of ammonia in the wet process of the disclosed technology is of concern, and motivates the removal of aluminum prior to the wet process. If one were, alternatively, to first leach the slag, then separate out the aluminum and re-leach the slag, the same is not only duplicitous, but also provides two paths for the ammonia to enter into a facility and threaten the health of employees. Specifically, as hereinabove discussed, the slag contains aluminum nitride (AlN); when water is added in the wet process of the disclosed system and methods, the AlN reacts with the water to produce aluminum hydroxide and ammonia gas:

$$2AlN + 3H_2O \rightarrow Al(OH)_3 + 2NH_3$$

Using steam to dry the alumina mitigates some of the ammonia gas production and release by drawing it into the steam, which is drawn out by the vent. Further, hoods or other venting apparatus can be provided above and/or about these components to draw gaseous ammonia out of the air around the alumina press and release it in a safe and environmentally responsible manner. The gaseous ammonia vented from the alumina press may be isolated via scrubbing by absorption. An ammonia stripper (e.g., air stripper or, if ammonia concentration is >1%, steam stripper) treats the gas and steam drawn from the alumina press into the venting system, removing gaseous and dissolved ammonia. The attrition scrubber and the alumina sump and pump of the system and methods of the disclosed technology are hermetically sealed with all conveyance apparatus among them such that the ammonia gas that may be released in the wet process is not released into the working environment, and rather is captured by the vents at the alumina press and by the ammonia stripper.

Notably, in a liquid stream of water and ammonia, ammonium ions exist in equilibrium with the ammonia:

$NH_4^+ + OH^- \leftrightarrow NH_3 + H_2O$

The pH of the liquid affects the ammonia state, wherein when the liquid stream is below pH 7, virtually all of the ammonia is soluble; above pH 12, virtually all of the ammonia is present as a dissolved gas. Between pH 7 and pH 12, both ammonium ions and dissolved gas exist together, wherein the percentage of dissolved gas increases with temperature and pH. Thereby, temperature and pH favor removal of ammonia from solution, wherein higher pH and/or temperature requires lower air flow to remove the ammonia from solution. In ammonia strippers, the pH and temperature are adjusted before the gas/liquid enters the stripper; as the liquid is distributed over the internal packing media of the ammonia stripper, it is broken up into small droplets which create significant surface area. Air enters the bottom of the stripper tower from a fan and travels upward through the packing. Since the ammonia is partially present as a gas or dissolved gas, some of the ammonia transfers from the water to the air. Suitable packing in the tower includes Jaeger Tri-Pack and Rauschert Hiflow packing, each of which provide a high surface/low pressure drop packing. Preferably the liquid is provided at either a pH of about 11 with lower water temperature (about 80° F.), or a lower pH (as low as 9.5), with warmer water (about 130° F.). Once the ammonia is removed from the liquid, it may be dispersed into the atmosphere, concentrated as ammonium sulfate, or thermally destroyed. The remaining water vapor and steam may be cycled into the boiler of the crystallization system. When higher temperatures are used to create greater efficiency of ammonia removal, a closed loop can be used, wherein air is sent to an absorber forming concentrated ammonium sulfate, and the clean air is then recycled back to the stripper.

Air pollution control regulations may limit the release of ammonia into the atmosphere. Therefore, a catalytic oxidizer may be coupled with the ammonia stripper, operating at a temperature of about 550° F. As the ammonia passes over the catalyst of the catalytic oxidizer, it is converted into nitrogen and water, and the remaining gas is innocuous and can be released into the atmosphere.

The salt effluent from the alumina filter press is concentrated by means of evaporation and crystallization, in what is referred to herein as a crystallization system. Particularly useful in the system of the disclosed technology is a vapor-compression desalination unit which captures vapor evaporated from the heated salt effluent through a heat exchanger, and recycles the heat back into the salt effluent. This unit further pressurizes the vapor to increase its temperature as it cycles through the heat exchanger. In such a crystallization system a boiler or other heat source is coupled with a circulation tank, and the salt effluent cycles through the circulation tank at temperatures in excess of 212° F. The high temperature causes the water in the effluent to vaporize. As the vapor cools it condenses and can be captured as clean water. Once the salt is oversaturated in the remaining salt effluent, it crystallizes or precipitates out of solution, forming a salt slurry. In some embodiments, where organics are present in the salt effluent, a defoamer such as a silicone based defoamer may be added to the effluent to limit foaming in the blower and heat exchanger.

A sump and pump system may collect distilled water from this process and provide the same to the attrition scrubber for processing of additional dry particle batches as hereinabove described, to the alumina sump to dilute the brine from the attrition scrubber, and for other system processes such as gland water for the system pumps. Steam generated by the boiler of the crystallization system may be provided by means of tubing to the alumina filter press and a salt filter press, as hereinafter described. This steam may have an initial temperature (at the time it leaves the boiler) of between about 230° F. and 240° F., for example.

The crystallized salt slurry product may then be delivered to a salt sump, where it is held for about 30 minutes, and on to a salt filter press by means of a disc pump, for example. The salt is then dried by the salt filter press, which uses steam from the boiler as hereinabove described to dry the salt product. Suitable presses include 1000 mm filter presses with 21 plates, manufactured by D. R. Sperry & Co., Aurora, Illinois. This product (comprising potassium chloride and sodium chloride) may then be used as salt slag for aluminum recycling processes to lower the melting point of feed stock sent to the aluminum recycling furnace. Using the process of the disclosed technology almost all of the salt in the original waste slag is recovered for reuse in the recycling process, which is of substantial value to recycling companies.

Distilled water from the process of drying the salt in the salt filter press may be collected and provided with the distilled water from the crystallization system for recycling through the system of the disclosed technology, as hereinabove provided.

Figure 2:
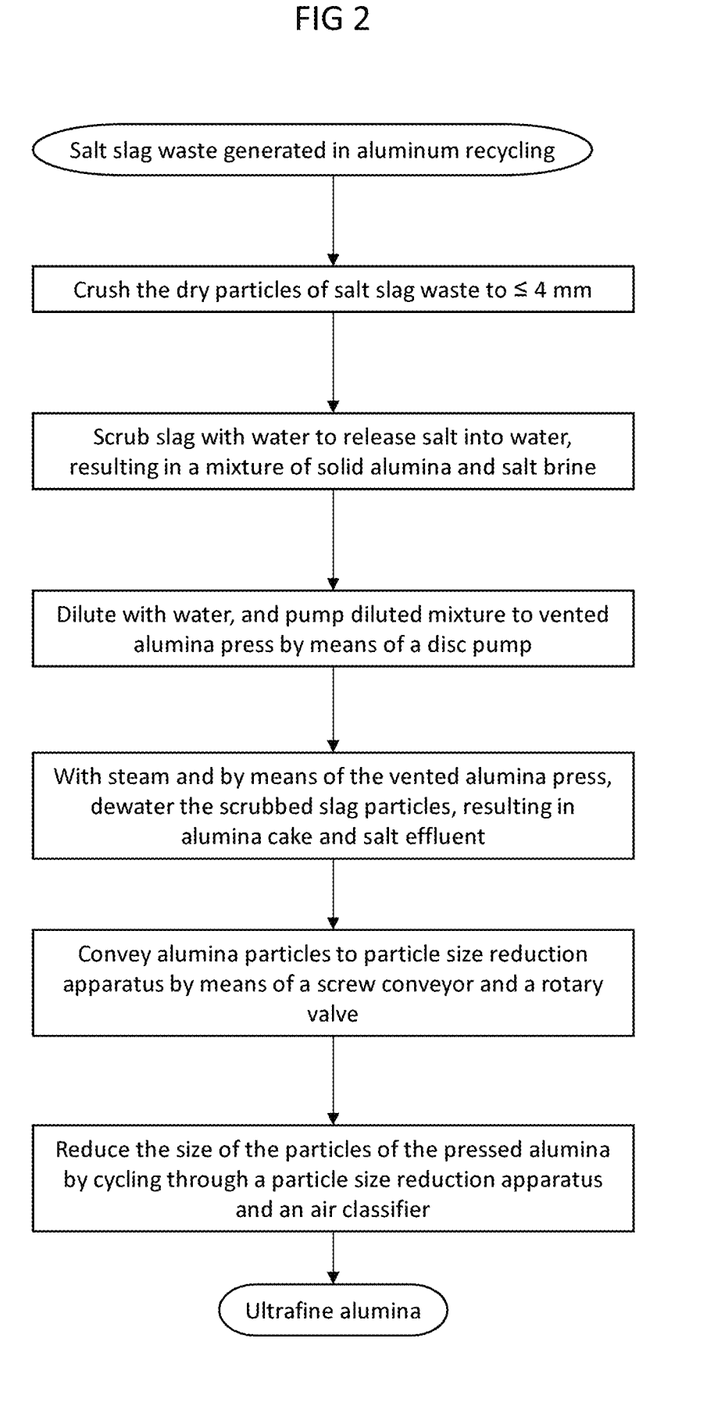
FIG. 2 is a process diagram of an embodiment of a method of the disclosed technology for producing ultrafine alumina from salt slag waste generated in aluminum recycling, the ultrafine alumina being useful in the manufacture of durable ceramic products.
Figure 3:
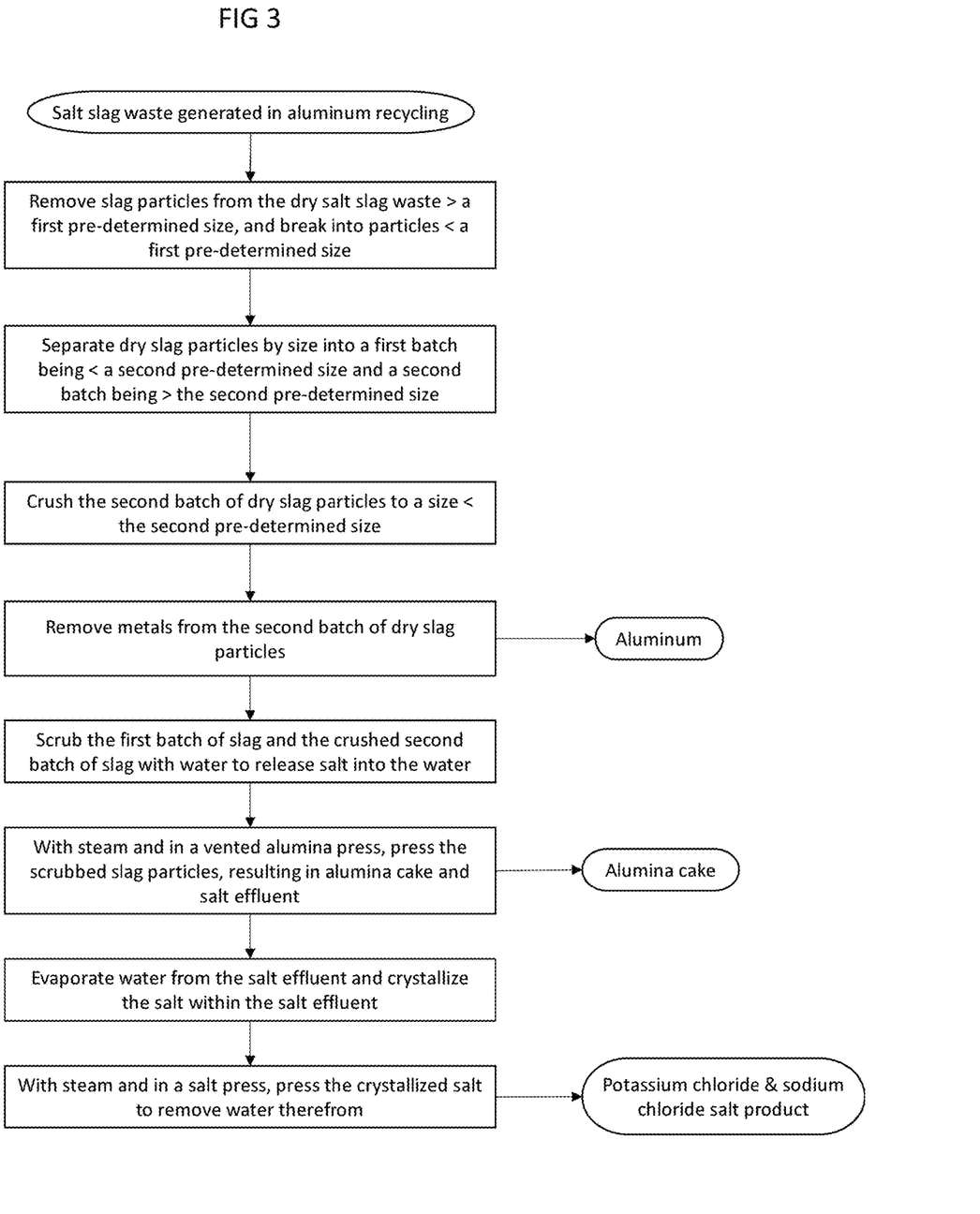
FIG. 3 is a process diagram of an embodiment of a method of the disclosed technology for recovering salts, aluminum and alumina from salt slag waste generated in aluminum recycling.
Figure 4:
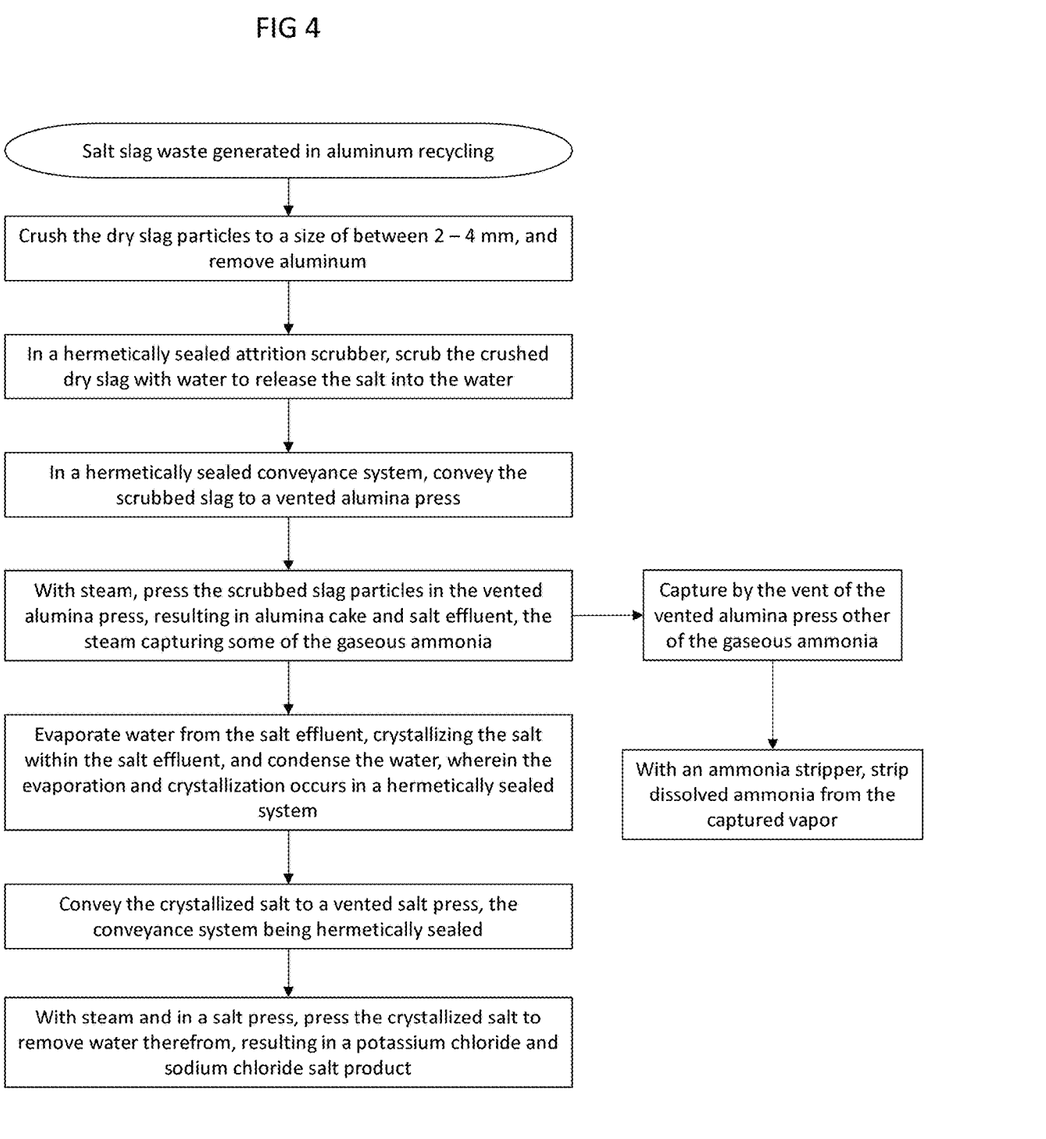
FIG. 4 is a process diagram of an embodiment of a method of the disclosed technology for capturing ammonia in a process recovering salts, aluminum and alumina from salt slag waste generated in aluminum recycling.

The dry alumina product produced by the methods hereinabove described may be used in the manufacture of ceramic bricks and other ceramic products. In an embodiment, the alumina is reduced in particle size from about 3 mm and finer to an ultrafine particle size of between about three microns to 1 mm. A screw conveyor may be used to convey the dry alumina to a rotary valve, which will supply the same to a particle size reduction apparatus, such as a jet mill, a ball mill, or a media mill. To ensure full particle size reduction, the particles may further be provided to an air classifier which separates out larger particles (e.g., >44 microns) for cycling back through the particle size reduction apparatus (and back through the air classifier). By this method, alumina is provided as a very fine particle of varying sizes, not exceeding 44 microns in this example, which is highly valuable in the production of durable ceramic bricks and other ceramic products.

Experimentation was conducted on salt produced and gaseous ammonia released from watered waste salt slag resulting from aluminum recycling processes. The experiments included a known mass of slag added to an amount of water in an Erlenmeyer flask fitted with a one-holed cork. A glass tubing was inserted in the hole in the cork, with the glass tubing entering the flask from the top to ensure that evolved gas traveled up the glass tube. A rubber tubing was used to connect the glass tube to a wash bottle filled with sulfuric acid of known concentration, wherein the tube inside the wash bottle went down to the bottom of the acid solution to ensure good contact of the evolved gas with the acid solution. The acid solution was switched out for fresh solution after a duration of time, noted in the following tables. The switched out solutions, partly neutralized by the evolved gas, were titrated with ammonium hydroxide or sodium hydroxide solution of a known concentration to help quantify how much of the acid was neutralized by the evolved gas. This information helped to determine how much salt was released from the slag within any particular time range after the slag was added to the water.

Preliminary experiments (Tables 2 and 3) and the experiments leading to the second set of results (Table 4) identified best conditions and ideal acid and base solution concentrations for the experiment. The last experiments performed which resulted in the third set of results (Table 5) show 100 ml of 0.2 molar acid solution is effective in quantifying the evolved gas from a 100 g slag in 100 ml water mixture at room conditions. The results show significant gas evolution within the first 20 minutes to 1 hour and 50 minutes, the amount of acid neutralization by the evolved gas increases after that until a point where there seem to be an equilibrium achieved. Before an equilibrium was reached the amount of acid neutralized corresponded to the duration of time between switching wash bottles. However, after the equilibrium is reached the duration between switching wash bottles did not have any influence on how much acid was neutralized, while gas was still being released from the slag/water solution.

In order to gain a full understanding on the amount of salt leaving the slag and dissolving into aqueous phase, 50 g slag was added to 50 ml water at room temperature. Several beakers of the same mixture were prepared, and each beaker was allowed to stir for a specific amount of time. After the time duration, the mixture was vacuum filtered, and the liquid filtrate was placed in an oven to evaporate water and recover the salt. Table 1 shows the time the mixture was allowed to stir, and the amount of salt recovered from the filtrate. The amount of salt recovered provides the necessary information of the amount of salt that leached out of the slag into the aqueous phase.

TABLE 1

Mass of salt recovered from 50 g slag in 50 ml water after a duration of time

| Sample | Duration of stirring | Mass of salt recovered, g |
|---|---|---|
| 1 | 1 hour | 54.65 |
| 2 | 2 hours | 58.33 |
| 3 | 3 hours, 10 mins | 55.74 |
| 4 | 4 hours | 54.33 |
| 5 | 5 hours, 10 mins | 55.36 |
| 6 | 6 hours | 55.09 |
| 7 | 22 hours | 56.48 |
| | Average | 55.71 ± 1.35 |

The amount of salt recovered seem fairly high possibly due to residual moisture. Statistically, the amount of salt recovered is similar irrespective of how long the mixture is allowed to stir.

In the next experiment (the results of which are shown below in Table 2), 100 g slag was added to 100 ml water. Gas evolving from the solution was passed through 0.1 M $H_2SO_4$ solution in a wash bottle, where wash bottles were switched at the times shown in the table. Titration with 0.1 M ammonium hydroxide determined the final concentration of the acid.

$$H_2SO_4 + 2NH_4OH \rightarrow (NH_4)_2SO_4 + 2H_2O$$

TABLE 2

| Gas Flow Duration, min | Volume of 0.1M $H_2SO_4$ for gas flow, ml | Molar concentration of acid remaining, M | Molar concentration of evolved $NH_3$ gas from slag solution reacted, mol/L | Mass concentration of evolved $NH_3$ gas from slag solution reacted, g/L |
|---|---|---|---|---|
| 30 | 25 | 0.0883 | 0.0234 | 0.3982 |
| 30 | 25 | 0.0883 | 0.0234 | 0.3982 |
| 120 | 25 | 0.0883 | 0.0234 | 0.3982 |
| 80 | 50 | 0.0896 | 0.0209 | 0.3547 |

Further experimentation (as shown in Table 3) included adding 250 g slag to 250 ml water; gas from solution was passed through 0.05 M $H_2SO_4$ solution in a wash bottle, and the wash bottles were switched at the times shown in the table. Titration with 0.05 M sodium hydroxide determined the final concentration of the acid.

$$H_2SO_4 + 2NaOH \rightarrow Na_2SO_4 + 2H_2O$$

TABLE 3

| Gas Flow Duration, min | Volume of 0.05M $H_2SO_4$ for gas flow, ml | Molar concentration of acid remaining | Molar concentration of evolved $NH_3$ gas from slag solution reacted, mol/L | Mass concentration of evolved $NH_3$ gas from slag solution reacted, g/L |
|---|---|---|---|---|
| 30 | 25 | 0.0480 | 0.0040 | 0.0680 |
| 30 | 50 | 0.0478 | 0.0045 | 0.0765 |
| 90 | 50 | 0.0480 | 0.0040 | 0.0680 |

This sample showed a high amount of gas released as observed in the pressurization of the tubing and the wash bottles. Evolved gas reactive-adsorption into the acid reached an equilibrium point in both analysis, which is the maximum possible. Gas adsorption did not increase further even when the run was allowed to proceed longer. The equilibrium reactive-adsorption point was higher when the acid concentration was high because more of the acid was neutralized for the 0.1 M $H_2SO_4$ than the 0.05 M $H_2SO_4$.

In the next experiment, performed twice as shown in Tables 4 and 5, 100 g slag was added to 100 ml water; gas from solution was passed through 0.2 M $H_2SO_4$ solution in a wash bottle, with the wash bottles changed at the times shown in the table. Titration with 0.2 M sodium hydroxide determined the final concentration of the acid.

$$H_2SO_4 + 2NaOH \rightarrow Na_2SO_4 + 2H_2O$$

TABLE 4

| Gas Flow Duration, min | Volume of 0.2M $H_2SO_4$ used for gas absorption, ml | Molar Concentration of acid remaining, M | Molar concentration of evolved $NH_3$ gas from slag solution that reacted, mol/L | Mass concentration of evolved $NH_3$ gas from slag solution that reacted, g/L | Total moles of $NH_3$ gas absorbed into acid |
|---|---|---|---|---|---|
| 30 | 100 | 0.1946 | 0.0108 | 0.1828 | 1.0753 |
| 110 | 100 | 0.1989 | 0.0022 | 0.0366 | 0.2151 |
| 100 | 100 | 0.1989 | 0.0022 | 0.0366 | 0.2151 |
| 190 | 100 | 0.1978 | 0.0043 | 0.0731 | 0.4301 |

TABLE 5

| Gas Flow Duration, min | Volume of 0.2M H$_2$SO$_4$ for gas flow, ml | Molar Concentration of remaining acid, M | Molar concentration of evolved NH$_3$ gas from slag solution reacted, mol/L | Mass concentration of evolved NH$_3$ gas from slag solution reacted, g/L | Total moles of evolved NH$_3$ absorbed into acid | % of acid neutralized |
|---|---|---|---|---|---|---|
| 20 | 100 | 0.1949 | 0.0103 | 0.1744 | 1.0256 | 2.56 |
| 30 | 100 | 0.1938 | 0.0123 | 0.2092 | 1.2308 | 3.08 |
| 31 | 100 | 0.1949 | 0.0103 | 0.1744 | 1.0256 | 2.56 |
| 30 | 100 | 0.1969 | 0.0062 | 0.1046 | 0.6154 | 1.54 |
| 86 | 100 | 0.1908 | 0.0185 | 0.3138 | 1.8462 | 4.62 |
| 30 | 100 | 0.1897 | 0.0205 | 0.3487 | 2.0513 | 5.13 |
| 84 | 100 | 0.1867 | 0.0267 | 0.4533 | 2.6667 | 6.67 |
| 1135 | 300 | 0.1867 | 0.0267 | 0.4533 | 8.0000 | 6.67 |

From the foregoing it is clear that ammonia evolving from a slag-water mixture is extremely high—over 500,000 ppm. If released in a contained, poorly ventilated environment, from a large amount of slag being processed with water using the process as hereinabove described, the ammonia release will be harmful to human health, if not deadly.

In another experiment to test the efficacy of the evaporation/crystallization of the salt effluent, 8,600 ml of salt effluent with 1 mL defoamer and two drops of green food dye were placed into an insulated boiling flask on a hot plate/stir plate located below the boiling flask which provided heat and mixing for the test. A thermocouple was installed to measure liquid temperature in the flask during boiling. Steam was collected and condensed through a condensing coil. Notably, the starting boil point was at 208° F., and during the end of the boil down study the boiling temperature flat lined at 223° F., indicating that the salts causing the boiling point to rise were actively precipitating out of solution, which is a good indication of the operational temperature required for a full scale system. The testing occurred at an elevation of 6,600 ft above sea level; therefore, up to an additional 10° F. may need to be added to the boiling point to adjust for lower elevations, and corresponding adjustments for higher elevations. Further, pressure may be used in an operational system, e.g. 3 psi in the flash vessel; this pressure adds up to an additional 10° F. to the boiling point.

After the steam was collected and condensed, the distillate had a final volume of 6,000 mL, with a total dissolved solids composite value of 57 ppm and a pH composite value of 10. The total volume of the remaining concentrate was 2,600 mL (a ratio of 3.3:1); the total volume of precipitated salts collected was 400 mL when hot, and continued to form during cooling, resulting in 1,000 mL salt. The salt was relatively anhydrous, with a small crystalline structure typical of sodium chloride and potassium chloride salts.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment, or in other described embodiments. Conversely, various features which are, for brevity, described in the context of a single embodiment, may also be provided separately or in any suitable subcombination. The Applicant hereby gives notice that new Claims may be formulated to such features and/or combinations of such features during the prosecution of the present application or of any further application derived therefrom.

The invention claimed is:

1. A system for recovering alumina from salt slag waste generated in aluminum recycling, the system comprising:
   a. a grizzly scalper for separating any dry particles of the salt slag above a first pre-determined size, the first pre-determined size being between 80 mm and 120 mm, wherein such particles above the first pre-determined size may be broken to a size below the first pre-determined size;
   b. a feed hopper for receiving and conveying the dry salt slag particles below the first pre-determined size to a sizing screen, the sizing screen separating the slag particles into two batches, the first batch being less than a second pre-determined size, the second batch being greater than the second pre-determined size, wherein the second pre-determined size is a value between 3 mm-5 mm;
   c. a hammer mill crusher for crushing the second batch of dry salt slag particles so that the non-metallic particles thereof are less than the second pre-determined size;
   d. an eddy current separator for removing metallic particles from the second batch of crushed dry salt slag particles;
   e. an attrition scrubber for scrubbing with water the first batch of dry salt slag particles and the crushed second batch of dry salt slag particles, with metals removed, to release the salt into the water and form a mixture of alumina particles and salt brine;
   f. a first sump and pump for collecting the mixture of alumina particles and salt brine and further diluting the mixture to a liquid to solid ratio of between 0.9 mL/g and 1.1 mL/g; and
   g. a vented alumina press for dewatering the mixture of alumina particles and salt brine, resulting in alumina cake and salt effluent, and wherein the pump of the first sump and pump conveys the diluted mixture of alumina particles and salt brine from the sump to the vented alumina press.

2. The system of claim 1, further comprising:
a. a vapor compression desalination unit coupled with a boiler for evaporating water from the salt effluent and crystallizing the salt within the salt effluent;
b. a second sump and pump, for receiving the crystalized salt mixture;
c. a salt press for dewatering the crystallized salt mixture, resulting in salt cake and water, wherein the pump of the second sump and pump conveys the crystallized salt mixture from the sump of the second sump and pump to the salt press;
d. a third pump to receive the water from the salt press and the boiler, and deliver the same to the attrition scrubber and the first sump; and
e. piping for delivering water vapor from the boiler to the vented alumina press and the salt press.

3. The system of claim 2, where the pumps of the first and second sump and pumps are each a disc pump.

4. The system of claim 1, further comprising a magnet for removing any ferrous metals from the dry salt slag particles before the remaining metals are removed by the eddy current separator.

5. The system of claim 1, further comprising a particle size reduction apparatus and an air classifier to reduce the particle size of the alumina cake to a size of equal to or less than 1 mm.

6. The system of claim 5, further comprising a screw conveyor and a rotary valve for conveying the pressed alumina to the particle size reduction apparatus.

* * * * *